United States Patent [19]
Kim

[11] Patent Number: 5,892,503
[45] Date of Patent: Apr. 6, 1999

[54] MULTIMEDIA CONSOLE KEYBOARD

[75] Inventor: Jason Seung-Min Kim, Cerritos, Calif.

[73] Assignee: AST Research, Inc., Irvine, Calif.

[21] Appl. No.: 863,640

[22] Filed: May 28, 1997

Related U.S. Application Data

[63] Continuation of Ser. No. 635,536, Apr. 22, 1996, abandoned, which is a continuation of Ser. No. 282,814, Jul. 29, 1994, abandoned.

[51] Int. Cl.$^6$ .................................................. G09G 5/00
[52] U.S. Cl. ........................ 345/168; 345/156; 345/157; 341/22; 341/27; 381/110
[58] Field of Search ................................... 345/168, 156, 345/157, 158, 169, 7, 167; 395/153, 154; 341/22, 27; 364/708.1; 381/110

[56] References Cited

U.S. PATENT DOCUMENTS

| | | | |
|---|---|---|---|
| 4,572,509 | 2/1986 | Sitrick | 273/85 G |
| 5,021,771 | 6/1991 | Cachman | 345/168 |
| 5,126,954 | 6/1992 | Morita | 364/708.1 |
| 5,237,327 | 8/1993 | Saitoh et al. | 341/22 |
| 5,307,297 | 4/1994 | Iguchi et al. | 345/169 |
| 5,375,165 | 12/1994 | Haber et al. | 341/22 |
| 5,410,497 | 4/1995 | Viletto | 364/708.1 |
| 5,414,444 | 5/1995 | Britz | 345/156 |

FOREIGN PATENT DOCUMENTS 1119821  5/1989  Japan.

OTHER PUBLICATIONS

IBM "Technical Disclosure Bulletin", vol. 36 No. 04 Keyboard Assembly with Docking speakers, Apr. 1993.
Press Release, Apr. 18, 1994.

*Primary Examiner*—Richard A. Hjerpe
*Assistant Examiner*—Kent C Lang
*Attorney, Agent, or Firm*—Knobbe, Martens, Olson & Bear, LLP

[57] ABSTRACT

A multimedia console keyboard provides a convenient user interface to provide multimedia functions easily accessible to the user. In general, the multimedia console keyboard provides speakers, microphones, volume control, brightness control, contrast control, a pointing device, an electronic keyboard template with contact sensitive ICON and a real time clock/calendar alarm and computer power control switch at the keyboard. The multimedia console keyboard provides an integrated analog-digital preprocessor with audio compression and expansion capabilities and other analog capabilities. Integrated audio allows for a closed-loop voice activation and control for the computer.

7 Claims, 7 Drawing Sheets

MULTIMEDIA CONSOLE KEYBOARD

"This application is a continuation of U.S. patent application Ser. No. 08/635,536, filed Apr. 22, 1996, now abandoned, which was a continuation of U.S. patent application Ser. No. 08/282,814, filed Jul. 29, 1994, now abandoned."

BACKGROUND OF THE INVENTION

1. Field of the Invention

The present invention relates to the field of user interfaces for multimedia computers. More specifically, the present invention relates to a user interface to control multimedia computer applications to integrate multimedia functions with a computer keyboard.

2. Description of the Related Art

Multimedia computers typically provide integration of audio, video, and computing. A mouse or other pointing device is also often used. User control of the audio and video functions, such as volume, brightness, and contrast are generally provided through a software logical console set up on the computer screen. Speakers are typically provided as independent units, built into the computer display, or into the computer cabinet. Similarly, microphones are typically separate items, integrated into the computer cabinet or into the display. The mouse is typically connected to the back of the computer cabinet via a conventional PS/2 compatible connector. Digitizing the audio signals in a multimedia computer is usually accomplished in the computer cabinet, requiring an analog interface for the main computer.

SUMMARY OF THE INVENTION

The prior art configurations do not facilitate the use of truly remote computer cabinets. The mouse connection and the power switch are inconvenient, and in multimedia applications, the prior art configurations require analog interfaces to manage analog multimedia information flow. The present invention provides an integrated multimedia console keyboard for multimedia computer applications. The multimedia console keyboard manages the analog and digital multimedia information at the keyboard level, and allows for digital interfaces between the keyboard and the computer system for increased reliability.

In general the multimedia console keyboard provides speakers, microphones, volume control, brightness control, contrast control, a pointing device, and conventional PS/2 connectors on each side of the keyboard for left-handed or right-handed mouse connection. Advantageously, the multimedia console keyboard also provides an electronic keyboard template with context sensitive ICONS. In the present embodiment, the multimedia console keyboard also provides a computer power (on/off) switch and a real time clock/calendar/alarm at the keyboard. The control functions are advantageously managed via an application specific integrated circuit (ASIC) with analog and digital interfaces. Preferably, the multimedia console keyboard interfaces to a conventional personal computer as a conventional 101-key keyboard, and to a multimedia computer as a fully integrated multimedia console keyboard.

One aspect of the present invention involves a multimedia computer keyboard that has a keyboard matrix having a plurality of keys. The multimedia computer keyboard has at least one speaker and at least one microphone associated with the keyboard. The multimedia computer keyboard further has a main controller associated with the keyboard. The main controller has an analog to digital converter coupled to the microphone and has a digital to analog converter coupled to the speaker. The main controller also couples to the keyboard matrix.

In one advantageous embodiment, the main controller further couples to a pointing device integrated with the keyboard. Advantageously, the multimedia computer keyboard further comprises a power switch for an associated computer, the power switch being integrated with the keyboard. Preferably, the main controller comprises a digital audio data compression and decompression controller. In one embodiment, the main controller further comprises a real time clock controller coupled to a clock display on the keyboard, the clock controller operating independent of a host computer.

In a further embodiment, the multimedia computer keyboard further comprises video monitor controls associated with the keyboard and coupled to the main controller, such as a contrast control and a brightness control for an associated computer monitor coupled to an associated host computer.

Another aspect of the present invention involves a multimedia keyboard for use with a computer having a display. The multimedia keyboard comprises a keyboard matrix having a plurality of associated keys, at least one speaker and at least one microphone associated with the keyboard, and a volume control associated with the keyboard. Advantageously, the multimedia keyboard according to this aspect of the invention comprises a pointing device associated with the keyboard, a computer power switch associated with said keyboard, and an integrated main controller associated with said keyboard. The integrated main controller has at least one analog interface and at least one digital interface, the speaker and microphone being coupled to the main controller via the analog interface.

In one embodiment, the multimedia keyboard further comprises at least one external peripheral device interface connector coupled to the main controller. Preferably, the external peripheral device interface connector has signal pins for conventional PS/2 signals, and has a plurality of signal pins assigned to carry digital audio data. Advantageously, the external peripheral device interface connector also has a signal pin assigned to carry a computer power signal originating at the multimedia keyboard for transmission to the computer. In one embodiment the multimedia keyboard has two external peripheral device interface connectors coupled to the main controller.

Still another aspect of the present invention involves a multimedia computer keyboard having a keyboard matrix with a plurality of keys, at least one microphone associated with the keyboard, and a main controller associated with the keyboard. The main controller has an analog to digital converter coupled to the microphone. The main controller is further coupled to the keyboard matrix. Advantageously, the main controller further couples to an interface for an associated host computer, the interface configured to carry digital audio signals to the host computer.

DETAILED DESCRIPTION OF THE PREFERRED EMBODIMENTS

The present invention involves a multimedia console keyboard which couples to a conventional personal computer as a conventional 101-key keyboard, and which couples to a multimedia computer adapted for the multimedia console keyboard as a fully integrated multimedia console keyboard.

Figure 1:
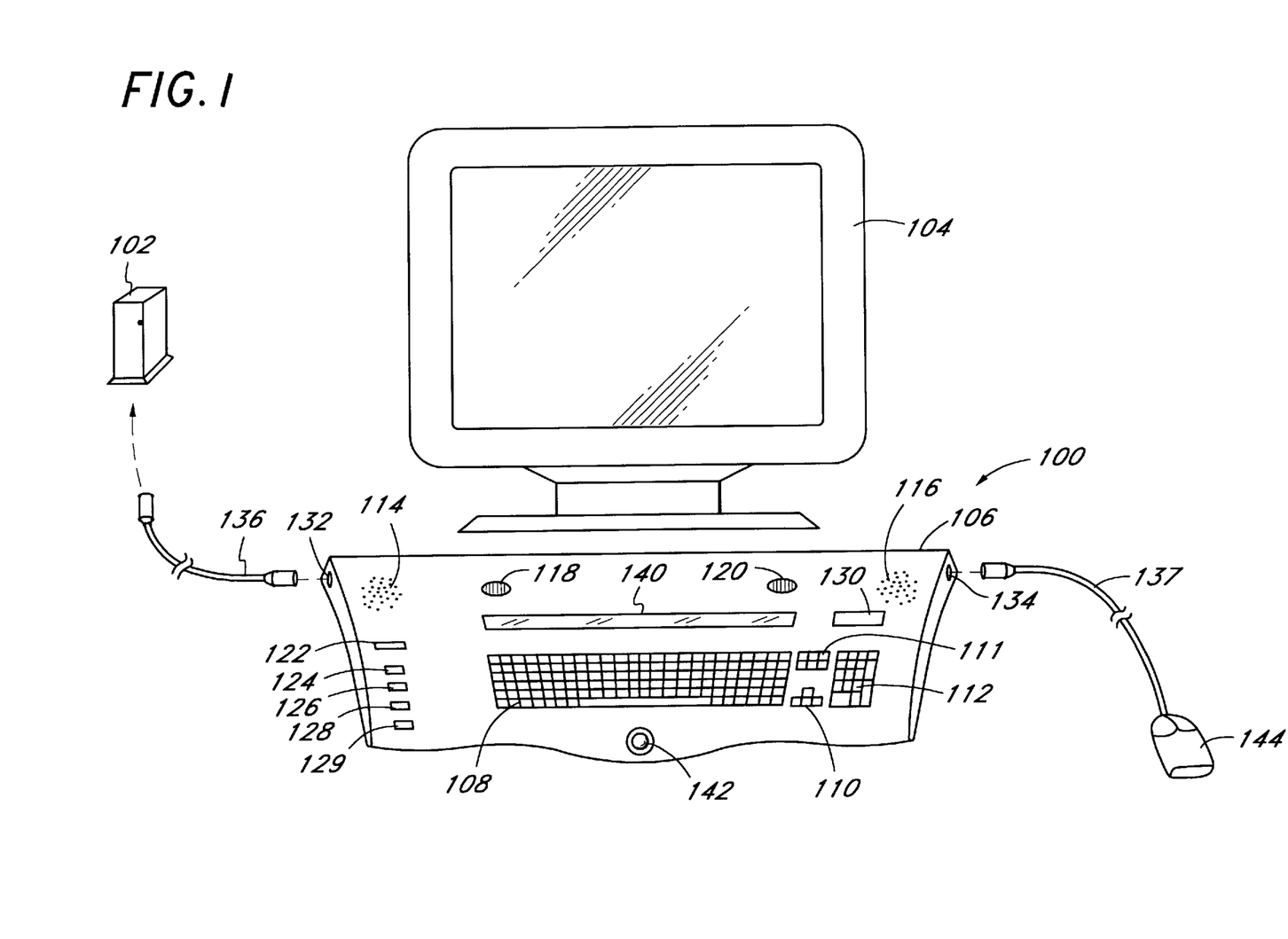
FIG. 1 illustrates a perspective view of one possible embodiment of the multimedia console keyboard in accordance with the present invention.

FIG. 1 illustrates a perspective view of one embodiment of a multimedia console keyboard 100 in accordance with the present invention. As seen in FIG. 1, the multimedia console keyboard couples to a host computer 102, such as a remote (hide-away) cabinet personal computer. Alternatively, if the computer is a fully integrated computer such as a notebook computer, the multimedia console keyboard 100 couples to the motherboard for the computer. As well understood in the art, the host computer 102 couples to a display 104, such as a multimedia monitor.

As depicted in FIG. 1, the multimedia console keyboard 100 comprises a keyboard housing 106 containing a standard keyboard key set 108 with conventional cursor keys 110 and position keys 111, a standard keypad 112, at least one speaker 114, 116, and at least one microphone 118, 120. In a preferred embodiment, the multimedia console keyboard 100 comprises a first speaker 114, a second speaker 116, a first microphone 118 and a second microphone 120. This supports stereo multimedia applications.

In the embodiment depicted in FIG. 1, the speakers 114, 116 and the microphones 118, 120 are integrated with the keyboard housing 106. However, in an alternative embodiment, the speakers 114, 116 may be separate units associated with the keyboard 100, separable units associated with the keyboard 100, or otherwise associated with the keyboard 100. Similarly, in an alternative embodiment, the microphones 118, 120 may be separate units associated with the keyboard 100, separable units associated with the keyboard 100, or otherwise associated with the keyboard 100.

The multimedia console keyboard 100 further comprises a host computer power (on/off) control switch 122, a volume control 124, a brightness control 126, a contrast control 128, and an auxiliary control 129. In the embodiment depicted in FIG. 1, the host computer power control switch 122, the volume control 124, the brightness control 126, and the contrast control 128 are integrated with the keyboard housing 106. In an alternative embodiment, the computer power control switch 122, the volume control 124, the brightness control 126, the contrast control 128, and the auxiliary control 129 may be associated with the multimedia console keyboard 100, yet not be integrated in the keyboard housing 106. The location of the computer power control switch 122 integrated (or otherwise associated) with the multimedia console keyboard 100 provides convenient power control for the host computer 102. As well known in the art, the computer power switch for the host computer 102 is typically provided on the computer cabinet, making remote cabinet placement inconvenient.

In the present embodiment, the volume control 124, the brightness control 126, the contrast control 128, and the auxiliary control 129 each comprises a slider or a wheel adjustment control which couples to a variable potentiometer, as described in greater detail below.

In the present embodiment, the multimedia console keyboard 100 further comprises a real time clock (RTC)/calendar/alarm. Advantageously, the clock/calendar/alarm has an associated clock display 130 integrated with the keyboard housing 106.

The multimedia console keyboard 100 further comprises at least one external peripheral device interface connector 132, 134. In the present embodiment, the external peripheral device interface connectors comprise conventional mouse connectors. Preferably, the multimedia console keyboard 100 comprises two mouse connectors, a left mouse connector 132 and a right mouse connector 134, one on each side of the multimedia console keyboard housing 106. This simplifies the use of a left-hand or a right-hand mouse. In the preferred embodiment, the mouse connectors comprise PS/2 compatible 9-pin connectors, as well understood in the art. The mouse connectors 132, 134 provide for interchangeable host/slave connection to couple to the host computer 102 and a mouse 144 via PS/2 connection lines 136, 137. Whichever mouse connector is not used to couple the multimedia console keyboard 100 to the host computer 102 can be used to couple the mouse 144, or any other external peripheral device, to the multimedia console keyboard 100.

In one preferred embodiment, the multimedia console keyboard 100 further comprises a built-in electronic keyboard template 140. Many computer application programs benefit from the use of a keyboard template describing or depicting key assignments to assist in use of the application program. The electronic keyboard template 140 can automatically provide context sensitive ICONS and templates. Advantageously, the electronic keyboard template 140 provides context sensitive ICONS and templates relating to the definition of keyboard keys such as function keys. An electronic keyboard template is described in further detail in U.S. Pat. No. 5,181,029, which is incorporated herein by reference.

In one advantageous embodiment, the multimedia console keyboard 100 incorporates a built-in pointing device 142 such as a track-ball or other pointing device.

Figure 2:
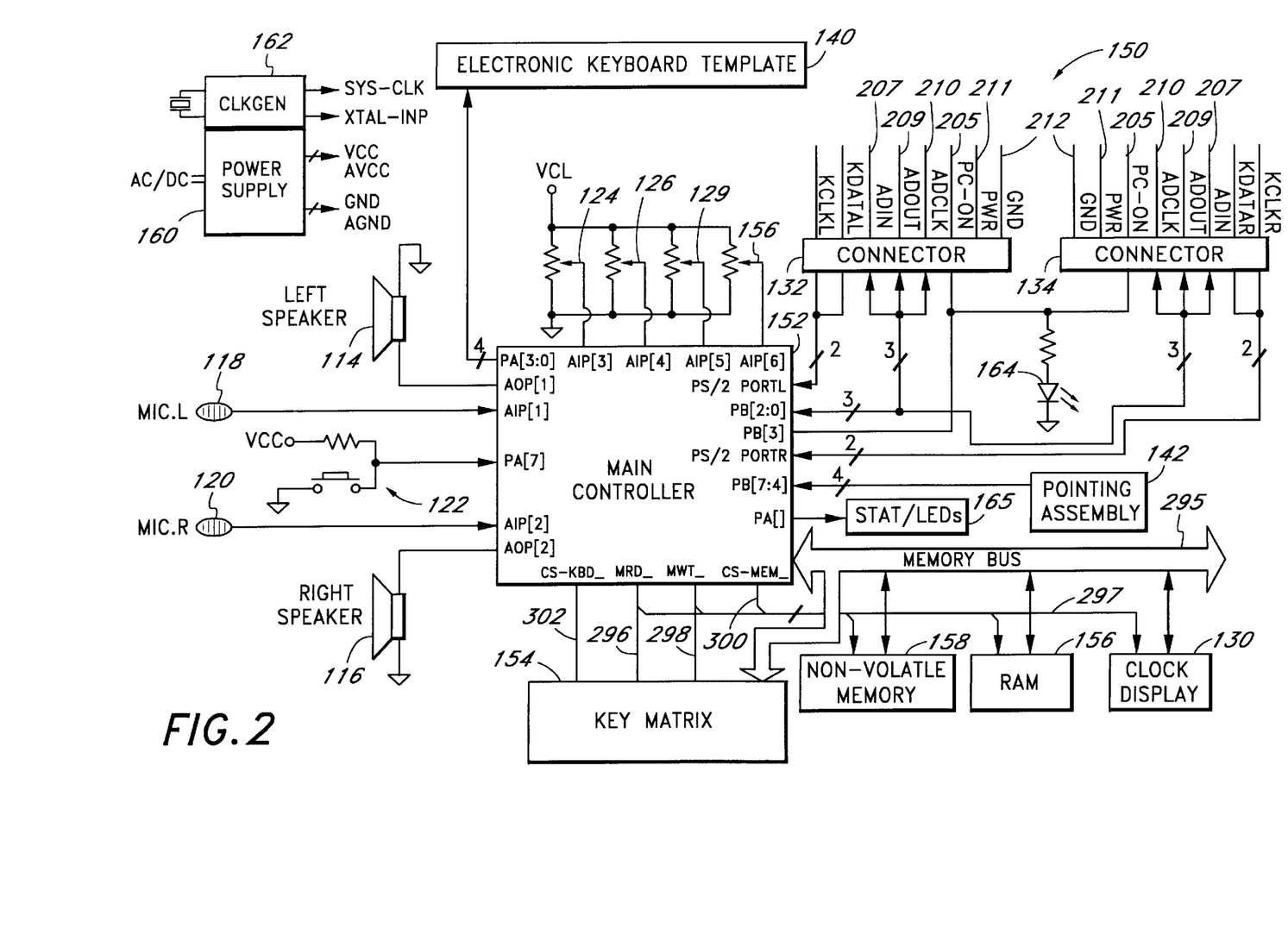
FIG. 2 illustrates a general block diagram of the control electronics for the multimedia console keyboard in accordance with the present invention.

FIG. 2 illustrates a general block diagram of the control electronics 150 for the multimedia console keyboard 100. As depicted in FIG. 2, control for the multimedia console keyboard 100 is through a main controller 152. This controller advantageously comprises an application specific integrated circuit (ASIC) designed to perform significantly all local functions of the multimedia console keyboard 100, such as interfacing with the host computer 102, controlling the mouse ports 132, 134, providing configuration scan port control for configuration inputs and outputs, providing time multiplexed memory control, scanning the keyboard matrix, controlling memory mapped input/output (I/O) devices, controlling at least one multifunction digital I/O port for I/O devices, and controlling analog input and output ports for audio and other analog systems (such as battery control). Advantageously, the controller also provides system power management functions, real-time controller functions and serial testing, such as joint test action group (JTAG) boundary scan testing. In the present embodiment, communications to the host computer 102 are digital in nature. This removes the complexity and unreliability of analog interfaces to the host computer, as often required in multimedia computers.

The main controller 152 couples to a keyboard matrix 154, to a volatile memory 156 (e.g., random access memory ("RAM")), to a nonvolatile memory 158 (e.g., a read only memory ("ROM") or a static random access memory ("SRAM")), to the first speaker 114 and the second speaker 116, to the first microphone 118 and the second microphone 120, to the host computer power switch 122, to the volume control 124, to the brightness control 126, to the contrast control 128, and to the auxiliary control 129.

Preferably, the speakers 114, 116 have associated amplifiers (not shown) for amplification of signals from the main controller 152. Similarly, the microphones 118, 120 preferably comprise signal conditioning circuitry as well understood in the art.

Advantageously, each of the volume control 124, the brightness control 126, the contrast control 128, and the auxiliary control 129 comprise slider or wheel adjustment controls coupled to potentiometers, as depicted in FIG. 2. The voltage of the taps of the potentiometers provides the input signal to the main controller 152. In the present embodiment, the auxiliary control 129 is provided for user definition. In the embodiment depicted in FIG. 2, the volume control 124, the brightness control 126, the contrast control 128 and the auxiliary control 129 are analog devices. Alternatively, each or any of the volume control 124, the brightness control 126, the contrast control 128 and the auxiliary control 129 comprises a digital control device, such as a counter, as well understood in the art.

In the present embodiment, the main controller 152 further couples to the pointing device 142 (i.e., the built in track-ball, or the like), to the left mouse connector 132 and to the right mouse connector 134. In the present embodiment, the left mouse connector 132 and the right mouse connector 134 provide external mouse connectors on the left and the right sides of the multimedia console keyboard 100 as depicted in FIG. 1. In the present embodiment, the left and the right mouse connectors 132, 134 comprise enhanced PS/2 compatible communication connectors with signal lines assigned to functions in addition to conventional PS/2 compatible mouse port functions, as further described below. In one embodiment, the main controller 152 also couples to the electronic keyboard template 140 and to the clock display 130.

The main controller 152 receives power from a power supply 160 and receives clock signals from a crystal clock generator circuit 162. Advantageously, the main controller 152 activates a power-on LED 164 when computer power is active. The main controller further couples to additional status LEDs 165, such as Caps Lock, Num Lock, and Scroll Lock LEDs.

Figure 3:
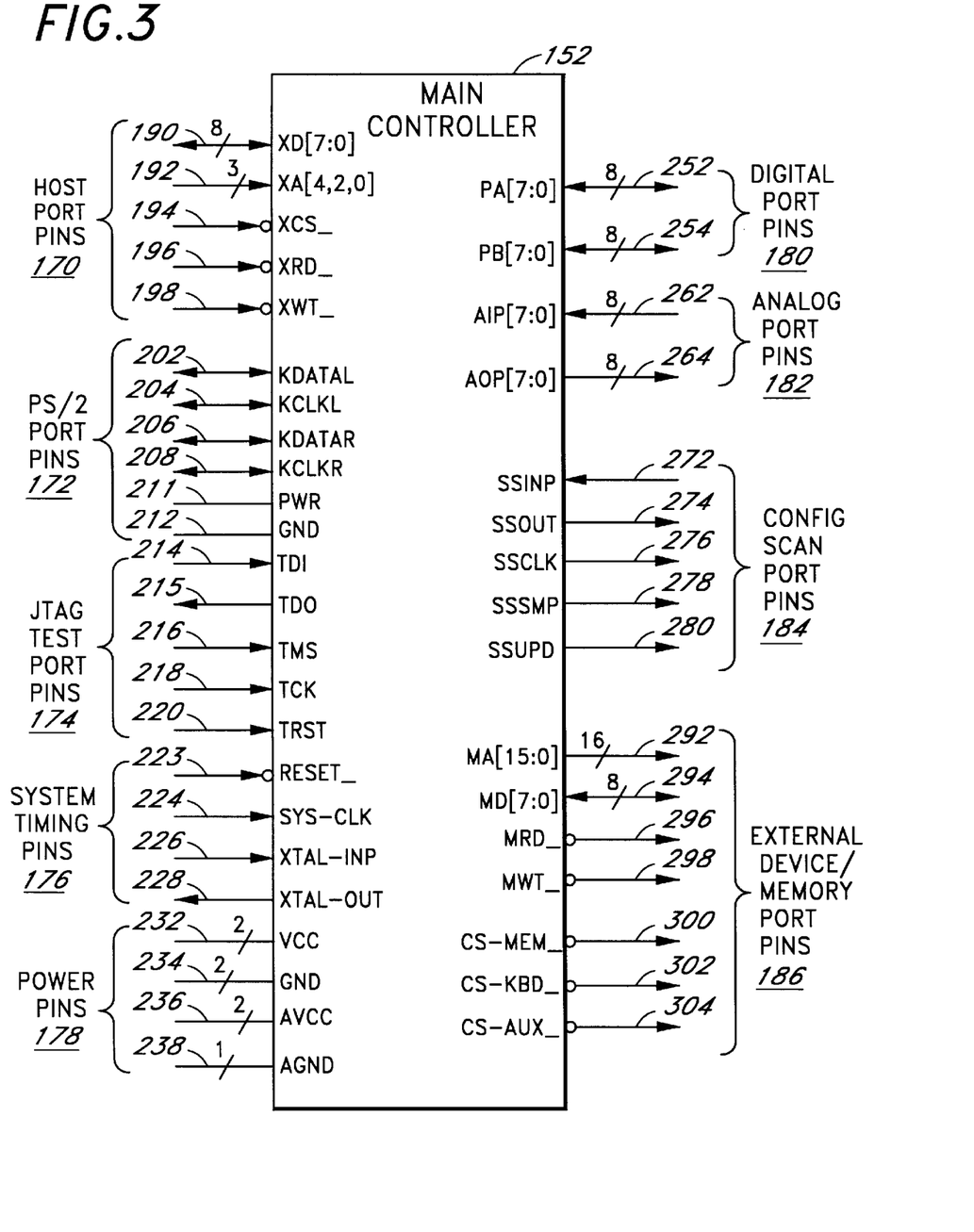
FIG. 3 illustrates a diagram of exemplary pin assignments for the main controller for the multimedia console keyboard implemented as an application specific integrated circuit.

FIG. 3 illustrates one embodiment for the pin assignments for the main controller 152. As depicted in FIG. 3, the main controller 152 has host port pins 170, PS/2 port pins 172, JTAG test port pins 174, system timing pins 176, power pins 178, digital port pins 180, analog port pins 182, configuration scan port pins 184 and external device/memory port pins 186. The pins of the main controller 152 are further explained with reference to the main controller functional block diagram of FIG. 4.

Advantageously, a companion main controller (not shown) is provided for the host computer 102. the companion main controller is identical to the main controller 152, but operates in what is referred to herein as "resident mode." The main controller 152 associated with the keyboard operates in a "remote mode." These operational modes are understood in the art for keyboard controllers. The companion main controller and the main controller are coupled via one of the mouse connectors 132, 134 and a mouse connector on the host computer coupled to the companion main controller.

Accordingly, the host port pins 170 are provided to carry signals for a host computer interface 188. For the companion main controller, the host computer 102 provides control information through, and receives data and status information from, the main controller 152 via an XD[7:0] data bus 190. Operating instructions for the companion main controller may also be downloaded from the host computer 102 via the XD[7:0] data bus 190. In the present embodiment, the XD[7:0] data bus 190 is an 8-bit bidirectional data bus used to transfer information between the host computer 102 and the companion main controller. The host port pins 170 further carry address signals on an XA[4,2,0] address bus 192. In the present embodiment, the XA[4,2,0] address bus 192 comprises latched address input lines which, in connection with an XCS_ chip select signal line 194, provide signals for interpretation of information on the XD[7:0] data bus 190.

In the present embodiment, the state of the signals on the XA[4,2,0] address bus 192 in connection with the signal on the XCS_ chip select signal line 194 indicate whether data on the XD[7:0] data bus 190 is a keyboard controller command, a real time clock command, a pulse code modulated audio signal or command for audio signals, or a system management interrupt (SMI) command which, in the present embodiment, is the highest level interrupt for the companion main controller.

An XRD_ host interface read signal line 196 provides the read signals for the host computer interface 188 of the companion main controller. When an active signal on the XRD_ host interface read signal line 196 is accompanied by an active signal on the XCS_ chip select signal line 194, the companion main controller provides information requested from the host computer on the XD[7:0] data bus 190. Similarly, an XWT_ host interface write signal line 198 provides write signals which, when accompanied with an active signal on the chip select XCS_ signal line 194, indicate to the companion main controller to receive information sent from the host 102 on the XD[7:0] data bus 190.

It should be understood that in the embodiment of FIG. 1 where the multimedia console keyboard 100 is coupled to a remote or hideaway host computer 102 via one of the mouse connectors 132, 134, the host computer interface 188 for the main controller 152 may be eliminated or may remain unused. for simplicity in using the same circuit for both the companion main controller and the main controller 152, the host computer interface 188 is unused for a main controller operating in the remote mode. For operations in the remote mode, the mouse connectors 132, 134 are used for communications with the host computer 102 (via the companion main controller at the host 102), as depicted in FIG. 1.

The PS/2 port pins 172 carry signals for PS/2 communications ports 200. In the present embodiment, there are two PS/2 communications ports 200. Accordingly, the signal lines (with appropriate indexing) are duplicated on the main controller 152 for two interfaces. In the present embodiment, the PS/2 communications ports 200 comprise conventional PS/2 compatible communications ports. Signal lines of the PS/2 communication ports couple to the enhanced mouse connectors 132, 134, as depicted in FIG. 2.

The PS/2 signal lines comprise a KDATAL left keyboard data signal line 202, a KCLKL left keyboard clock signal line 204, a KDATAR right keyboard data signal line 206, and a KCLKR right keyboard clock signal line 208. As is well understood in the art, the KCLK keyboard clock signal lines are bidirectional I/O pins for clocking external keyboard or mouse data, and the KDATA keyboard data signal lines are bidirectional I/O pins for transferring keyboard or mouse data. A power signal line 211 and a ground signal line 212 are also provided by the PS/2 communication port signal lines 172.

As mentioned above, in accordance with the present invention, the mouse connectors 132, 134 are enhanced to have some of the pins coupled to signal lines in addition to the conventional clock and data signal lines. More specifically, the connectors 132, 134 have pins assigned to carry audio data and control signals and to carry a host computer power-on signal for the hideaway computer cabinet. Consistent with this, the enhanced mouse connectors 132, 134 have signal lines from the connectors assigned to provide signals for audio control and data and the power-on signal for the hideaway computer cabinet. In the present embodiment, the enhanced mouse connectors 132, 134 have a host computer power-on PC-ON signal line 205, an audio-in ADIN signal line 207, an audio-out ADOUT signal line 209, and an audio-clock ADCLK signal line 210, as depicted in FIG. 2. These signal lines connect to the digital and analog ports of the main controller 152 as further discussed below.

The host computer power-on PC-ON signal line 205 from one of the digital ports of the main controller 152 provides a digital power-on control signal for the hideaway computer cabinet over the enhanced PS/2 connector 132, 134. The audio-in ADIN signal line 207 carries digital pulse code modulated audio data and digitized control signals such as the brightness control and contrast control signals for input to the multimedia console keyboard 100. Similarly, the audio-out ADOUT signal line 209 carries digital pulse code modulated audio data and digitized control signals (e.g., brightness, contrast, volume) for output to the host computer 102. The audio-clock ADCLK signal line 210 provides the clock signals for transfer (input and output) of the digitized, pulse-code-modulated audio data and audio control signals. The enhanced PS/2 port connectors 132, 134 also provide the conventional power (PWR) and ground (GND) signal lines 211, 212 as depicted in FIG. 2.

The JTAG test port pins 174 carry signals for conventional boundary scan testing via a JTAG test port and controller 213. The JTAG test port pins 174 comprise conventional JTAG boundary test signal lines as well understood in the art. Preferably, the main controller 152 is designed with conventional JTAG serial test capability. The JTAG test port controller 213 provides conventional JTAG test control, as well understood in the art. Accordingly, a TDI signal line 214 for the JTAG test port 213 provides an input pin for serial shifting-in of JTAG command and scan data for boundary testing and firmware debugging. A TDO signal line 215 provides an output signal pin for shifting-out of JTAG command and scan data for boundary testing and firmware debugging. A TMS signal line 216 provides a control input pin for selecting the boundary scan path for boundary testing. A TCK signal line 218 provides a strobe input pin for clocking JTAG scan data and commands. Finally, a TRST signal line 220 provides a control input for resetting the JTAG controller 213 for initialization. Boundary scan testing is well understood in the art.

The system timing pins 176 carry master clock input signals for the synchronized main controller system and a crystal input for the internal real time clock controller 222 of the main controller 152. The system timing pins 176 comprise a RESET_ signal line 223 for general multimedia console keyboard reset, a system clock SYS-CLK signal line 224, a crystal input XTAL-INP signal line 226, and a crystal output XTAL-OUT signal line 228. The system clock SYS-CLK signal line 224 provides an external clock input pin for synchronized operations of the main controller 152. In the present embodiment, the main controller 152 runs at 33 MHz. The crystal input XTAL-INP signal line 226 provides crystal input for the real time clock controller 222 of the multimedia console keyboard 100. In the present embodiment, the crystal or external oscillator operates at 32.768 KHz for internal timers or the internal real time clock (RTC) controller 222. The crystal out XTAL-OUT signal line 228 is an external feedback output for the real time clock crystal oscillator. It carries the inverted signal of the crystal input XTAL-INP signal.

The power pins 178 carry signals for power and ground from the power supply 160 for both digital and analog electronics of the main controller 152 via a power control unit 230. The power control unit 230 is coupled to the power supply 160. In one embodiment, the power control unit 230 provides power management for the main controller 152. In the present embodiment, the power control unit 230 accepts signals over power supply voltage VCC signal lines 232. In the present embodiment, the power supply voltage VCC signal lines 232 comprise two power supply signal lines, one for internal core logic and another for peripheral I/O drivers. In the present embodiment, the two power supply signal lines provide +5V DC or +3.3V DC power. In the present embodiment, the main controller is designed to operate on either 5V DC or 3.3V DC. The power supply voltage VCC signal lines 232 provide power for digital electronics. In addition, the power control unit 230 accepts signals on return supply GND signal lines 234. In the present embodiment, two return supply signal lines are provided, one for internal core logic and another for peripheral I/O drivers. The return supply GND signal lines 234 provide ground for the digital electronics.

The power control unit 230 further accepts power on analog voltage power supply AVCC signal lines 236. In the present embodiment, two analog voltage power supply signal lines are provided to supply power for an analog-to-digital convertor (ADC), a digital-to-analog converter (DAC), I/O drivers and analog reference drivers. In the present embodiment, the two analog voltage power supply signal lines provide +5V DC or +3.3V DC power signals. The power control unit 230 is coupled to an analog ground AGND signal line 238, which provides the ground for analog electronics of the main controller 152.

The digital port pins 180 carry signals for multifunction digital I/O ports 250 for the main controller 152. In the present embodiment, two digital I/O ports are provided as part of the main controller 152, accessed via digital port A (PA[7:0]) signal lines 252 and digital port B (PB[7:0]) signal lines 254. In the present embodiment, each digital I/O port is an eight-bit I/O port.

Each digital port provides a digital interface for the main controller 152. As depicted in FIG. 2, I/O pins from digital port A couple to a plurality of status indicators and LEDs 165, the host computer power switch 122, and to the electronic keyboard template 140. As depicted in FIG. 2, in the present embodiment, I/O pins from digital port B couple to the power-on LED 164, to the pointing assembly 142, and to the audio pins for the mouse connectors 132, 134. The output from the digital port pin which couples to the Power-on LED 164 also couples to each enhanced mouse port connector 132, 134 to provide a power-on signal for the host computer 102.

As further depicted in FIG. 2, three of the multifunction digital I/O port pins (port B in the present embodiment) can be used for the audio-in ADIN signal line 207 of the PS/2 port, the audio-out ADOUT signal line 209 of the PS/2 port 200 and the audio-clock ADCLK signal line 210 coupled to the enhanced PS/2 port connectors 132, 134. FIG. 2 depicts using three signal lines, PB[2:0], from digital I/O port B for the audio-in, audio-out and audio-clock signals. As noted above, the host computer has a companion main controller which accepts the digital communication of audio data over the enhanced mouse connectors 132, 134. The host computer 102 is also configured to accept the power-on signal on the power-on PC-ON signal line 205 via the companion main controller.

In addition, as depicted in FIG. 2, four signal lines from one of the digital I/O ports provide control for the electronic keyboard template 140. FIG. 2 depicts, as an example, using four signal lines, PA[3:0], from digital port A for coupling to the electronic keyboard template 140.

The analog port pins 182 carry signals for analog ports 260 for the main controller 152. In the present embodiment, two analog ports are provided (an analog input port and an analog output port) for analog interface functions. The analog input port is accessed via the analog input port AIP[7:0] signal lines 262, and the analog output port is accessed via the analog output port AOP[7:0] signal lines 264. In the present embodiment, the analog ports provide eight channels for analog input for an 8-bit ADC and eight channels for analog output from an 8-bit DAC.

For purposes of utilizing the analog ports 260 for the multimedia console keyboard 100 of the present invention, FIG. 2 illustrates one possible embodiment of some connections to the analog input and output pins of the main controller 152. As depicted in FIG. 2, the left microphone (MIC.L) 118 couples to channel one AIP [1] of the analog input port and the right microphone (MIC.R) 120 couples to channel two AIP[2] of the analog input port. Channel three AIP[3], channel four AIP[4], channel five AIP[5], and channel six AIP[6] of the analog input port couple to the volume control 124, the brightness control 126, the contrast control 128, and the auxiliary control 129, respectively.

Advantageously, channel zero AIP [0] to the analog input port provides an input channel utilized as an unbuffered calibration channel for the analog-to-digital converter as further explained below.

For the present implementation of the multimedia console keyboard 100, FIG. 2 further illustrates possible connections for the analog output port signal lines such as for the left speaker 114 and the right speaker 116. As depicted in FIG. 2, the left speaker 114 couples to channel one AOP[1] of the analog output port, and the right speaker 116 couples to channel two AOP[2] of the analog output port.

For an embodiment where the multimedia console keyboard 100 is provided with a direct interface to the display 104, the remaining analog output channels could be utilized to control the display contrast and brightness. One or more analog output channels could also be used to provide reference voltages for the input channels, as further explained below.

The configuration scan port pins 184 carry signals for configuration I/O operations via a serial configuration scan port 270 for the main controller 152. In one embodiment, the configuration scan port 270 provides for configuration monitoring and control for main controller sub-systems. As further explained below, the configuration scan port pins 184 are typically expanded with external expansion latches to increase the number of I/O configuration pins. The configuration scan port 270 receives signals on a serial scan input SSINP signal line 272 which provides an input pin for the serial scan port 270. The configuration scan port 270 provides signals on a serial scan output SSOUT signal line 274 which provides a signal line for outputting configuration data from the configuration scan port 270. Further, the configuration scan port 270 provides an output strobe SSCLK signal line 276 which carries a clock signal for shifting serial configuration data on the serial scan input SSINP signal line 272 and the serial scan output SSOUT signal line 274. The configuration scan port 270 also provides a sample strobe SSSMP signal line 278 which provides a strobe signal for sampling of configuration inputs from expansion latches for the configuration port 270. Finally, the configuration scan port 270 provides an update strobe SSUPD signal line 280 which carries a strobe signal for updating the configuration scan port output to the expansion latches. In other words, the update strobe SSUPD signal line 280 carries a signal to strobe the serial shifted-out data onto parallel output latches described below.

The external memory/device port pins 186 provide signals to and from the main controller 152 via an external device/memory port 290. In the present embodiment, the external device/memory port 290 provides an external device interface for memory, memory mapped I/O devices, and the keyboard matrix 154, which is preferably memory mapped in the present embodiment. In the present embodiment, the external device port 290 provides an interface for memory such as the nonvolatile memory 158 (e.g., ROM or SRAM) and the volatile memory 156. In the present embodiment, if SRAM is utilized as the nonvolatile memory 158, the SRAM can receive instructions downloaded from the host computer 102 during a down-load operation. This allows for the program and data instructions for the main controller 152 to be updated without replacing a memory chip, such as a ROM. During main controller operation, instructions are fetched from the nonvolatile memory 158 for execution or moved to the volatile memory for execution. Memory space not used for memory can be used for additional memory mapped devices.

The external device/memory port 290 provides address signals on memory address MA[15:0] signal lines 292. In the present embodiment, a 16-bit address is provided. Bidirectional I/O MD[7:0] signal lines 294 are provided for transferring data between external memory and memory mapped devices and the main controller 152. A memory read MRD_ signal line 296 carries signals for read control. As well understood in the art, when the memory read signal is active, the addressed device provides valid data on the bidirectional I/O MD[7:0] signal lines 294. A memory write MWT_ signal line 298 is provided to control write operations to external devices. A memory chip select CS-MEM_ signal line 300 carries signals for memory chip select signals. Similarly, a keyboard chip CS-KBD_ select signal line 302 carries signals for keyboard chip select during keyboard scan operations. An auxiliary chip select CS-AUX_ signal line 304 carries a chip select signal for auxiliary external devices. In the present embodiment, there are 64 Kbytes of memory space available for each chip select device (memory, memory mapped keyboard, and auxiliary device). Accordingly, if 60 Kbytes of nonvolatile memory (e.g., ROM or SRAM) are provided, 4 Kbytes of volatile memory could be provided with the memory chip select. If additional memory is needed, the auxiliary chip select signal line can be used to address an additional 64 Kbytes of memory.

As depicted in FIG. 2, the Keyboard matrix, as a memory mapped device, couples to the external device/memory port 290 via a memory bus 195 (comprising the bidirectional I/O MD[7:0] signal lines 294 and the memory address MA[15:0] signal lines 292), the keyboard chip select CS-KBD__ signal line 302, the memory read MRD__ signal line 296 and the memory write MWT__ signal line 298. Similarly, the non-volatile memory 158, the volatile memory 156 and the clock display 130 couple to the external device/memory port 290 via the memory bus 295 and a memory control bus 297 (comprising the memory chip select CS-MEM__ signal line 300, the memory read MRD__ signal line 296 and the memory write MWT__ signal line 298). Other memory mapped devices couple in a similar manner to the external device/memory port 290.

Figure 4:
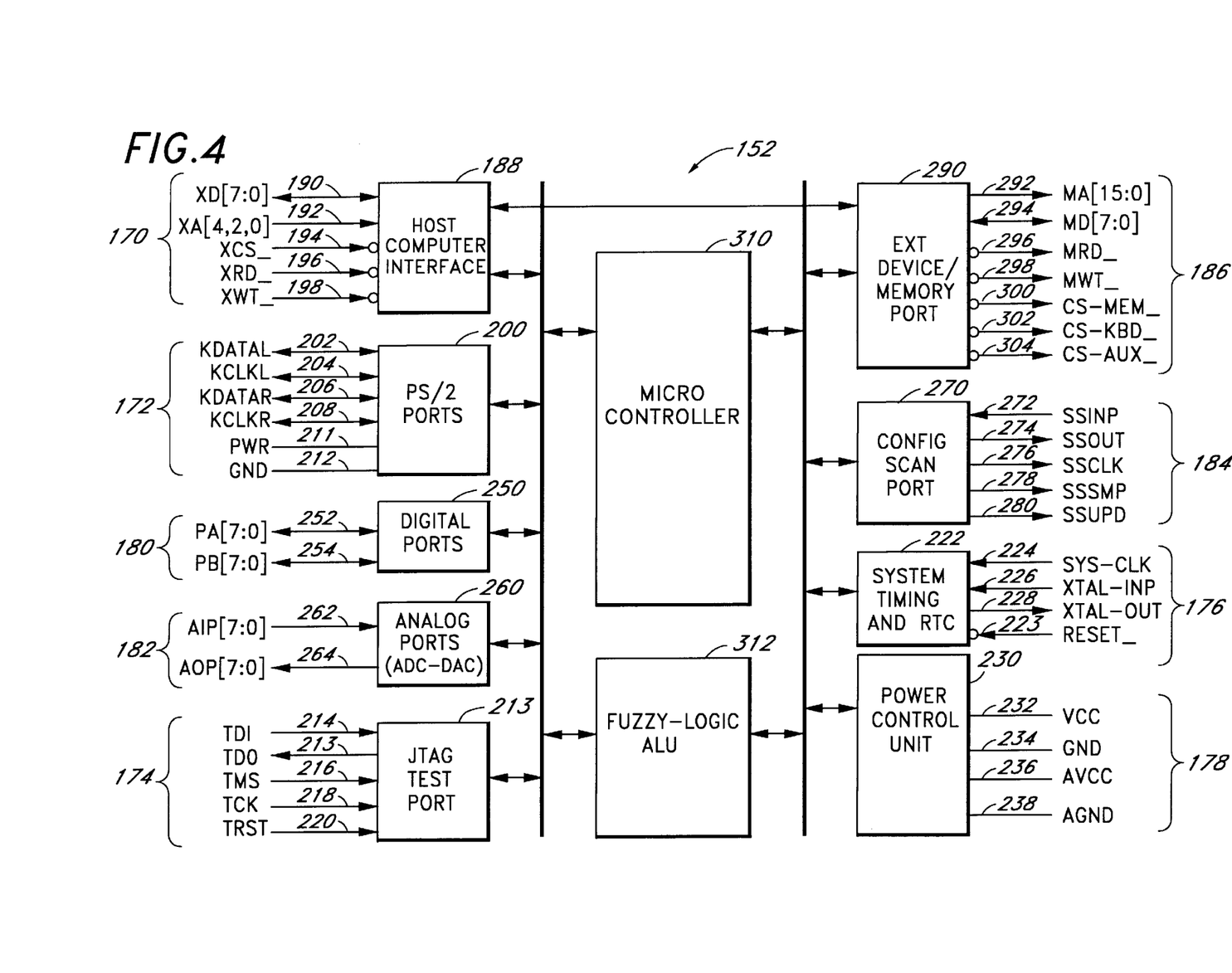
FIG. 4 illustrates a functional block diagram of the main controller for the multimedia console keyboard.

As illustrated in FIG. 4, the main controller 152 for the multimedia console keyboard 100 comprises a central microcontroller 310, such as an INTEL 8032 microcontroller, or similar microprocessor. In the present embodiment, the central microcontroller 310 is designed to use the INTEL 8032 instruction set, but is designed with faster Micro Processing Architecture such as RISC type architectures with faster CMOS technology. The faster Micro Processing Architectures allow for reduction of the number of clock cycles per machine cycle. This allows the main controller 152 to provide the bandwidth necessary for the multimedia functions provided.

The main controller 152 further comprises fuzzy-logic 312 which supplements the central microcontroller 310 with an added arithmetic logic unit (ALU) for digital signal processing for the main controller 152. Advantageously, the fuzzy logic provides pattern recognition functions useful on such applications as voice recognition, battery management, or any other analog control function. The fuzzy logic could also provide compression and decompression for the audio signals. However, in the present embodiment, compression and decompression are provided by the central microcontroller 310.

Figure 5:
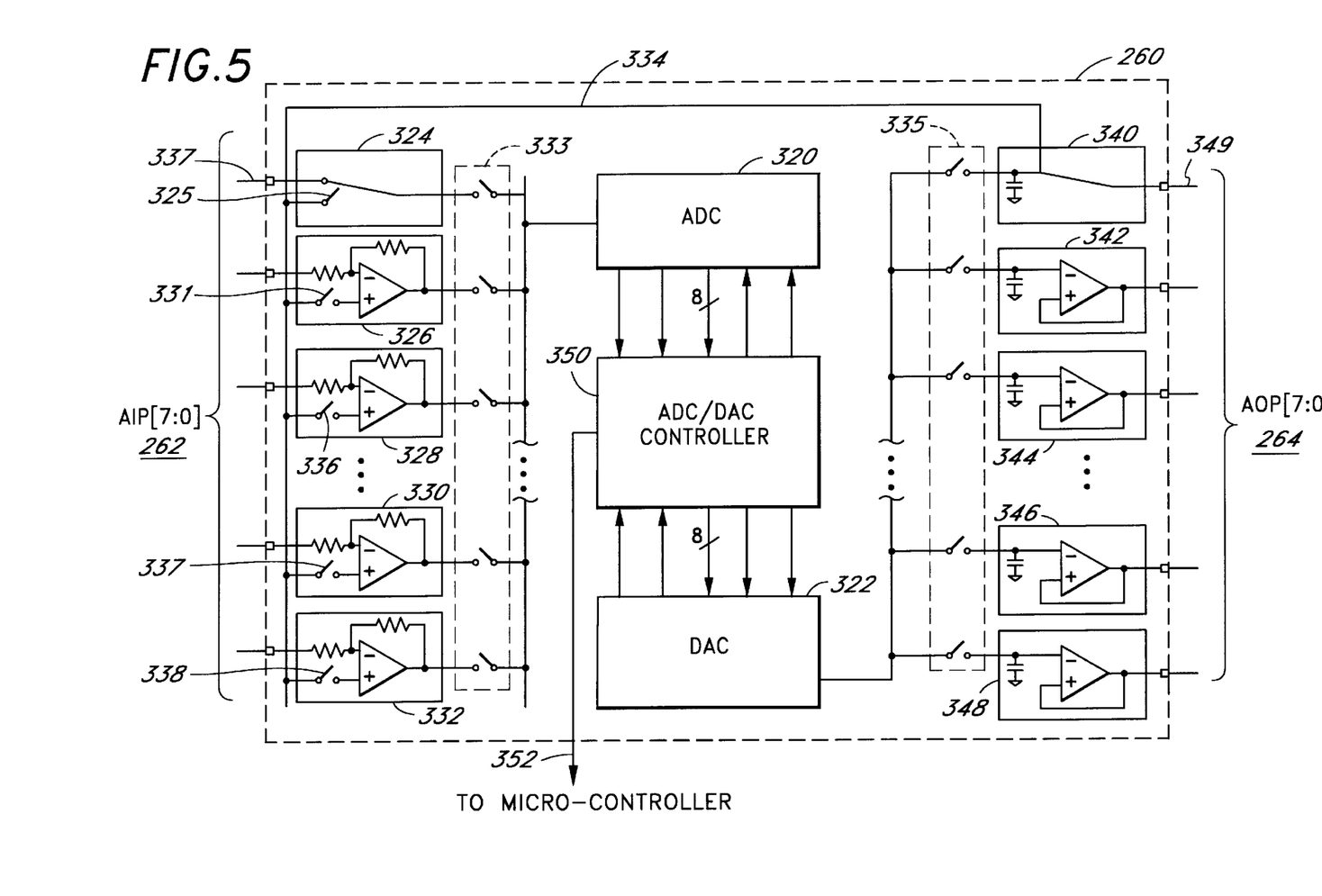
FIG. 5 illustrates a functional block diagram for the analog input and output ports for the main controller of the multimedia console keyboard.

FIG. 5 illustrates additional detail of analog input and output port circuitry of the main controller 152. In general, each analog input channel provides an internal preamp (having 20 Kohms of negative-feedback in the present embodiment). The amplified/attenuated analog input signals are multiplexed into an 8-bit sample/hold successive approximation ADC for digitization. Each analog output provides operational amplifier drivers which hold the 8-bit digital-to-analog converter (DAC) output value at the output pins.

Specifically, the analog I/O port comprises an ADC 320 and a DAC 322. A plurality of input stages 324, 326, 328, 330, 332 at their inputs couple to respective analog input port AIP[7:0] pins 262 and at their outputs to the ADC 320 via a multiplexer 333. In the present embodiment, all but one of the pre-amplifier input stages 324, 326, 328, 330, 332 provide negative feedback to normalize the input voltages for the ADC 320. The present embodiment provides 20 Kohms of negative feedback for the preamp of the input stages having preamps. Advantageously, the input stages also have programmable gain via input resistors $R_1$, $R_2$, $R_3$, $R_4$. In the present embodiment, gain is programmable for 20 dB or 40 dB of gain for each input stage with a preamp. A reference voltage for the input stages is provided from the DAC 322 via a reference voltage signal line 334 and to the individual input stages 324, 326, 328, 330, 332 via reference signal switches 325, 331, 336, 337, 338. Because the DAC 322 is generally highly precise, a reference voltage signal can be provided by the DAC 322 on the reference voltage signal line 334. The reference voltage is provided on the reference voltage signal line 334 through a channel 0 output stage 340 via a demultiplexer 335. The channel 0 output stage is unbuffered in the present embodiment, allowing direct propagation of the reference signal to the reference signal voltage line 334 when the demultiplexer 335 selects the output of the DAC 322 for the channel 0 output stage 340.

The channel 0 input stage 324 is unbuffered. Therefore, the reference signal on the reference voltage signal line 334 can be directly coupled to the ADC 320 through the reference signal switch 325 for the channel 0 input stage 324 for calibration of the ADC 320. A channel 0 input pin 337, when the reference voltage switch 325 is open, can be coupled directly to the ADC 320 via the multiplexer 333 for analog-to-digital conversion of the signal on the channel 0 input pin without buffering.

The reference signal on the reference signal voltage line 334 also provides a bias or comparison value for the buffered input stages when the reference switches 331, 336, 337, 338 for the buffered input stages 326, 328, 330, 332 are closed.

A plurality of amplifier output stages 340, 342, 344, 346, 348 couple (via the demultiplexer 335) at their inputs to the output of the DAC 322 and at their outputs to the analog output port AOP[7:0] pins 264. The amplifier output stages 340, 342, 344, 346, 348 respond to the output of the DAC 322 to provide an amplified voltage to the analog output port pins AOP[7:0] 264. The analog output stages provide drivers which hold the DAC output value at the output pins AOP[7:0] 264. As mentioned above, in the present embodiment, the channel 0 output stage 340 is a nonbuffered output stage for the reference signal and/or for output on the channel 0 output signal line 349.

An ADC/DAC controller 350 responds to signals from, and provides control signals to, the ADC 320 and the DAC 322 to control sampling and conversions operations. The ADC/DAC controller 350 also receives signals from and provides signals to the central microcontroller 310 via the microcontroller signal lines 352.

Figure 6:
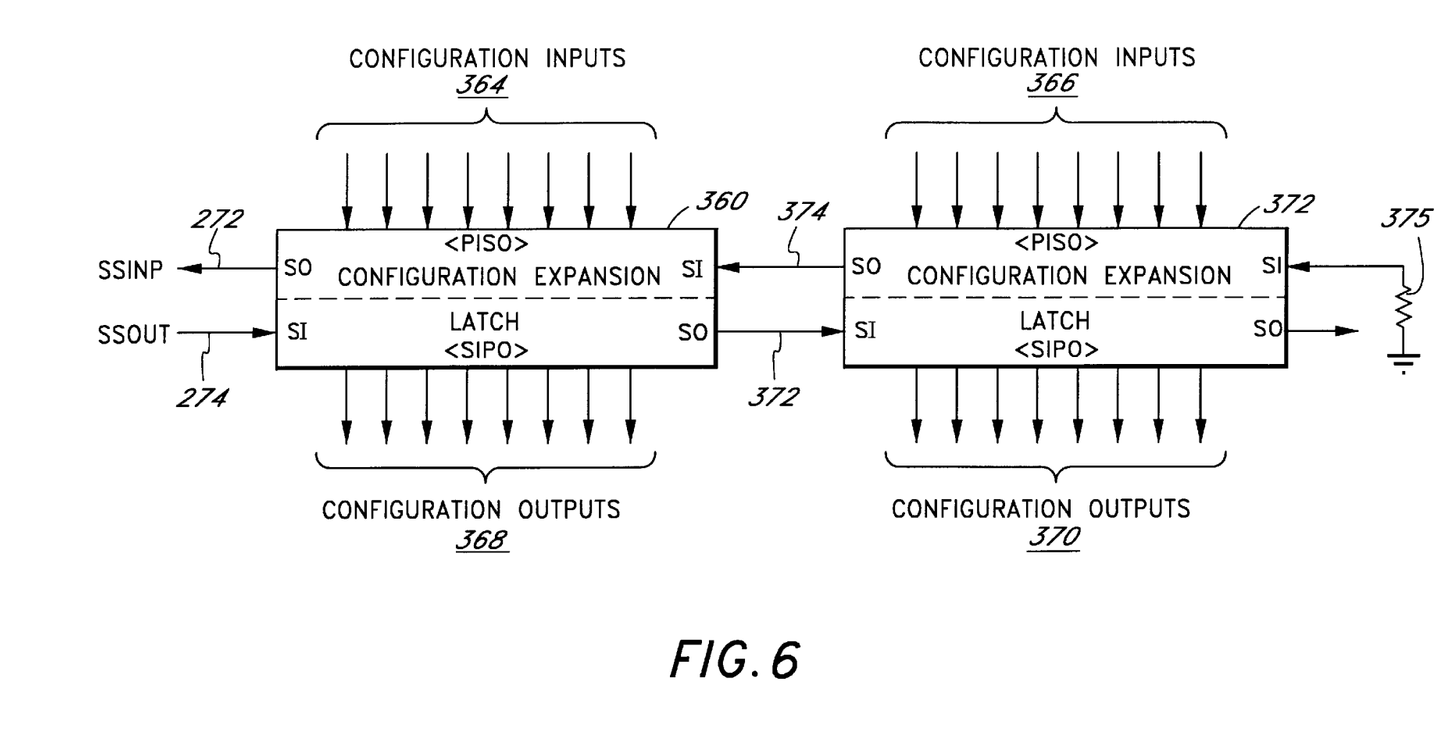
FIG. 6 illustrates one embodiment for configuration scan port expansion latches in accordance with the present invention.

FIG. 6 depicts a functional block diagram of configuration expansion latches 360, 372 for the configuration scan port 270. The configuration expansion latches provide expanded configuration inputs and configuration outputs for the main controller 152. Preferably, the latches comprise shift register latches which accept parallel inputs and direct the inputs as serial outputs (parallel-in, serial-out or "PISO") and also accept serial inputs and direct the them to parallel outputs (serial-in, parallel-out or "SIPO"). Accordingly, the configuration expansion latches receive parallel data on configuration inputs 364, 366, and shift the data serially into the configuration scan port 270 via the serial scan input SSINP signal line 272. Similarly, the configuration expansion latches receive serial output data from the configuration scan port 270 via the serial scan output SSOUT signal line 274 and latch this data in parallel onto configuration outputs 368, 370. As seen in FIG. 6, the configuration expansion latches 360, 372 are interconnected serially via serial data signal lines 372, 374. It will be understood that additional expansion latches can be added to further expand the configuration inputs and outputs for the configuration scan port 270. Advantageously, the last configuration expansion latch has its unused serial input connected to ground via a resistor 375.

Figure 7:
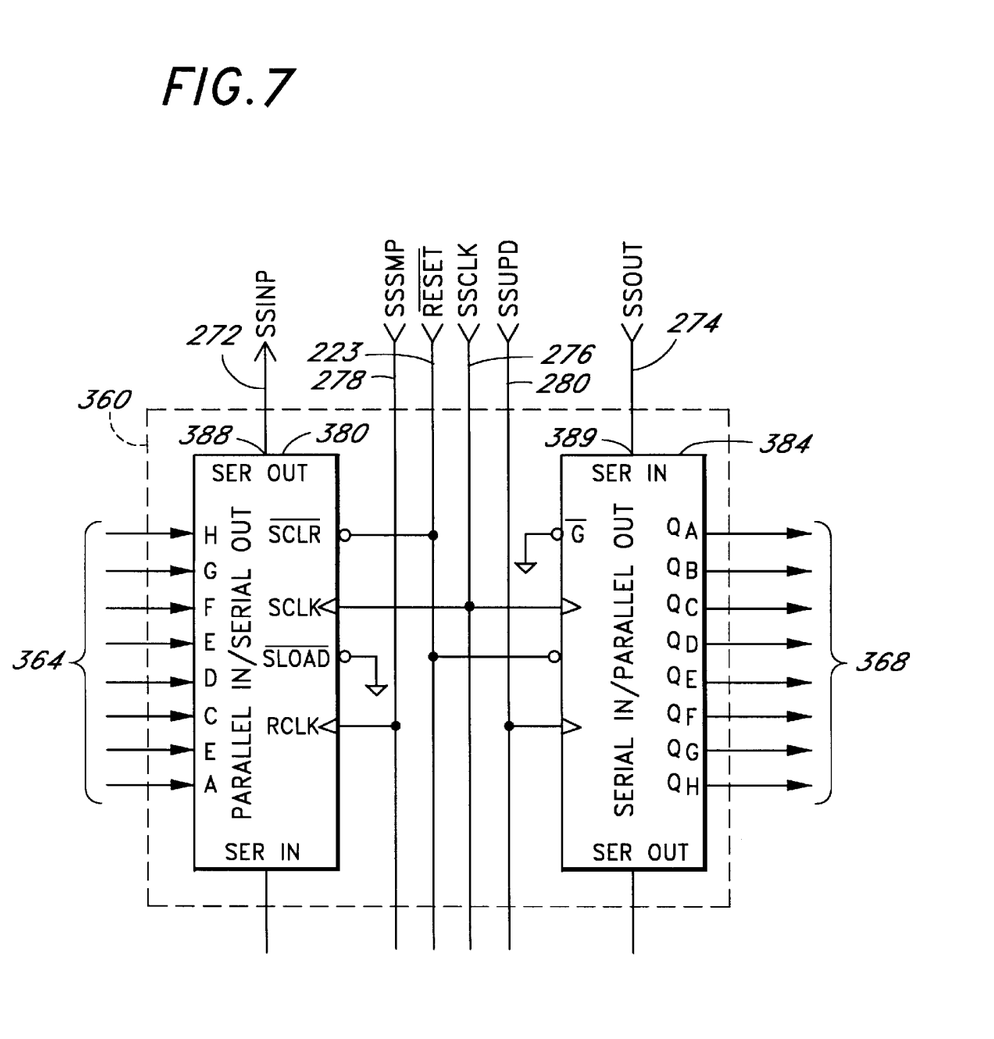
FIG. 7 illustrates a schematic diagram of one stage of the expansion latches of FIG. 6.

FIG. 7 provides a schematic diagram for one exemplary embodiment of one expansion latch 360 for the configuration scan port 270. As depicted in the exemplary embodiment of FIG. 7, the configuration expansion latch 360 comprises two 8-bit shift register latches, one for parallel input and one for parallel output. Accordingly, the configuration expansion latch 360 comprises a first serial-/parallel-in, serial-out register 380 with latched inputs. In one embodiment, the serial-/parallel-in, serial-out register 380 comprises a 74HC597 shift register latch. Similarly, for parallel configuration outputs, the configuration expansion latch 360 comprises a serial-in, serial-/parallel-out register 384 with latched outputs. In the present embodiment, the serial-in, serial-/parallel-out register comprises a 74HC595 shift register. At the connection to the configuration scan port 270, a serial output 388 of the parallel in register 380 couples to the serial scan input SSINP signal line 272. Similarly, a serial input 389 of the parallel-out register 384 is coupled to the serial scan output SSOUT signal line 274. The remaining control signals (RESET_, SSCLK, SSSMP, SSUPD) connect to the shift register latches via a control bus 392.

The configuration inputs and outputs may comprise any of a number of signals. For instance, for a first input configuration register 380, the inputs may comprise a display backlight (on/off) configuration input, a suspend configuration input, a brightness_up input, a brightness_down input, a contrast_up input, a contrast_down input, a PCMCIA (in/out) configuration input, and many other possible inputs. On the output side of the first configuration expansion latch 360, a plurality of outputs may be provided such as a power_on (LED) configuration output, a turbo_speed (LED) output, a scroll_lock (LED) output, a num_lock (LED) output, a caps_lock (LED) output, and a func_lock (LED) output.

Additional configuration inputs for a portable computer may comprise a power good input, a battery good input, an auxiliary power good input, and a docked input. Additional configuration outputs may comprise a battery-fail output, and a battery-low output. Additional configuration outputs and inputs can be provided for particular applications.

Controller Operations

In the present embodiment, the main controller 152 provides all the functions of a conventional keyboard controller such as an INTEL 8742 or 8042 keyboard controller. The main controller 182 also provides all the interface circuitry and control logic and functions for the multimedia features of the present multimedia console keyboard 100.

Advantageously, the main controller 152 (particularly the companion main controller) provides the functions of an IBM-AT compatible keyboard controller/host computer interface as part of its conventional keyboard controller functions. The host computer interface 188 provides an 8042 or 8742 look-alike host interface. Accordingly, the host computer interface 188 provides an input buffer, an output buffer, a status register and a control register. As well understood in the art, the host computer 102 forwards control and data information through the XD[7:0] data bus 190. This data bus is also used to down-load instructions for operation of the central microprocessor 310 of the companion main controller. Communications from the host to the main controller 152 of the keyboard 100 are carried out via one of the mouse connectors 132, 134 via the connection cable 136.

With respect to keyboard operation, the main controller 152 provides the function of scanning the keyboard matrix 154. In the present embodiment, the keyboard scan operations are configured to utilize a memory-mapped keyboard matrix in conjunction with the external memory/device port 290 to read the keys of the keyboard. In accordance with the preferred embodiment of the present invention, the keyboard scan is performed as described in U.S. Pat. No. 5,280,283, owned by the assignee of the present application.

Advantageously, the main controller 152 also provides for system power management functions. Accordingly, in one embodiment, the main controller 152 is an interrupt driven controller which enters a suspend or hibernation mode when no peripheral device is currently requesting service or utilizing the main controller 152, and the main controller 152 is not actively executing instructions. This provides a localized suspend mode independent of the host computer 102. In other words, when the main controller 152 detects no activity from the peripheral devices (including the host) for a predetermined period of time, the main controller 152 initiates (with a software instruction) a power conservation mode. Interrupt sensors for each peripheral device sense activity by any respective peripheral device and activate an interrupt indicator when peripheral device activity is detected. The main controller 152 then resumes active processing and services the interrupt. Additional detail is provided on such an interrupt driven system in U.S. Pat. No. 5,237,692 whereby each peripheral device has an associated detector which provides interrupts to the peripheral controller. Accordingly, the rows of the keyboard matrix 154 are coupled to a keypressed detector (not shown) which provides an interrupt to the central microcontroller 310 when a key is pressed. In the present embodiment, the real time clock 222 which can also provide periodic interrupts to cause the main controller 152 to resume active processing in order to provide mail-box maintenance functions or other functions which require periodic processing by the main controller 152. Advantageously, the real time clock 222 does not enter a sleep mode when the main controller 152 enters the sleep made.

The main controller 152 provides the PS/2 compatible ports 200 for external peripheral devices. As explained above, the present embodiment includes two PS/2 communication ports 200 coupled to separate enhanced mouse connectors 132, 134 on the keyboard 100. Advantageously, the PS/2 compatible communications ports 200 are interchangeable for host and slave purposes. Accordingly, interface software or firmware is provided for communications between the main controller 152 and the host 102, an external keyboard (not shown), an external keypad (not shown), the external mouse 144, or an external track-ball (not shown), any of which can be connected to one of the mouse port connectors 132, 134.

As mentioned above, the mouse port connectors 132, 134 of the present embodiment are enhanced connectors with signal lines, which although present in a conventional 9-pin connector, are assigned to provide audio data input and output signals for the transfer of digitized audio between the host computer 102 and the multimedia console keyboard 100. Accordingly, three of the signal lines of the enhanced mouse connectors 132, 134 are defined for audio signals. As depicted in FIG. 2, the audio-out ADOUT signal line 209, the audio-in ADIN signal line 207 and the audio-clock ADCLK signal line 210 are provided for audio data transfer. The audio-in ADIN signal line 207, the audio-out ADOUT signal line 209 and the audio clock ADCLK signal line 210 are coupled to respective digital port pins for transmission and reception of audio data. Also, the host computer power signal from one of the digital I/O ports is coupled to the enhanced mouse connectors 132, 134 PC-ON signal line 205. Accordingly, when the keyboard located power switch 122 is activated, the main controller 152 asserts an active signal on the host computer power on PC-ON signal line 205 of the mouse connectors 132, 134. The host computer companion main controller accepts the signal on a respective mouse connector on the host computer 102 and responds by activating computer power. The active signal on the PC-ON signal line 205 will also activate the power-on LED 164.

As briefly mentioned above, the main controller 152 further provides a memory/external device interface 290 for interfacing with external memory or other memory mapped external devices. The host computer 102 accesses memory and memory mapped devices via the external memory/device port 290 in a conventional manner. Advantageously, the external memory/device port 290 is time multiplexed. Therefore, all devices coupled to the memory port 290 provide tri-state outputs.

The instructions for operation of the main controller 152 are stored in the nonvolatile memory 158, as explained above. Providing SRAM for the nonvolatile memory 158 allows for downloading of instructions from the host for updates and modifications to the main controller 152 operations without replacement of a ROM chip. The instructions for the main controller 152 are accessed via the memory port 290. The keyboard matrix also is memory mapped. Accordingly, the keyboard matrix is coupled to the external memory/device port 290 for scanning operations. The memory port 290 can also provide access to additional auxiliary devices. Auxiliary devices may comprise additional memory or memory-mapped devices. With the three chip select signal lines 300, 302, 304 described in the present embodiment, and 16 address lines MA[15:0] 292, the external memory/device port 290 has three blocks of memory space, each block being 64 Kbytes.

In the present embodiment the main controller 152 also comprises the real-time controller 222 with a clock, calendar and alarm. Advantageously, the real-time controller 222 is crystal controlled with a crystal oscillator such as the crystal oscillator 162 depicted in FIG. 2. Preferably, the real-time controller 222 provides an IBM-AT compatible real-time controller interface for the host via the enhanced mouse connectors 132, 134. Advantageously, the real-time controller 222 interface provides an address buffer and a data buffer. As well known in the art, the address buffer provides indexing for the real-time controller registers; and the data buffer provides access to the indexed register. Advantageously, the function of the real-time controller registers are emulated in firmware.

The real-time controller 222 allows for control of time sensitive functions at the keyboard level without the use of the host computer 102. For instance, advantageously, the real-time controller 222 has an event timer such as a 32-bit event timer which is accessible by the host computer 102. Information is advantageously stored in a small CMOS memory such as a 114 byte conventional CMOS RAM or a 256 byte extended CMOS RAM for the real-time controller 222. Additionally, an audible alarm can be provided at the multimedia console keyboard 100 which operates independent of the host 102 and is battery backed up.

Given the integrated audio for the multimedia console keyboard 100, the multimedia console keyboard 100 can provide complete closed-loop voice activation and control tasks based on the real time clock without interference with or involvement of the host computer 102. For instance, with a typical calendar reminder system, the multimedia console keyboard 100 can provide a reminder via an audio message, or the multimedia console keyboard 100 can send a message via the host 102 to the display, or both. In conventional systems, if the user is not present at the computer, the user may not receive the message. Some calendar reminder systems remove the message from the screen after a few seconds.

With the integrated audio of the multimedia console keyboard 100, the calendared event can be announced with audio to the user. The multimedia console keyboard 100 then continually reminds the user (audibly and at predetermined intervals) until the keyboard 100 detects an oral response from the user or detects a keyboard response from the user. The oral response is recognized by the pattern recognition capabilities of the fuzzy logic 312. Other voice recognition based tasks can also be provided. More preferably, the main controller 152 of the keyboard 100 detects via the microphones 118, 120 if the user is present by "listening" for any audio input data from the surrounding environment. When the main controller 152 determines that the user is present, the keyboard 100 can then announce the message via the speakers 114, 116. If the user does not acknowledge the announcement, the keyboard 100 can wait until it again detects the presence of the user, and again announce the message.

The real-time controller 222 further allows the main controller 152 to enter a hibernation or sleep mode yet receive an interrupt at periodic intervals from the real-time controller 222 for time sensitive tasks. For instance, the real-time controller 222 may provide periodic interrupts to the central microcontroller 310 for the main controller 152 for mail box maintenance or any other time sensitive task.

Preferably, the configuration scan port 270 provides for essentially unlimited configuration expansion for the main controller 152. Some examples of configuration inputs and outputs were provided above with the discussion of the configuration scan port 270.

The digital I/O ports 250 of the main controller 152 comprises a digital multi-function I/O ports with one or more registers for each digital I/O port. In the present embodiment, two digital I/O ports are provided as described above. Advantageously, the multi-function digital I/O ports allow software access to the main controller configurations. The digital I/O ports 250 also allow for user configurable hardware implemented functions. These ports can also be used for user programmable event detection and interrupt generation. Advantageously, the digital I/O ports have open-drain, pull-up inputs.

As briefly mentioned above, the digital audio communications between the host 102 and the multimedia console keyboard 100 are carried out utilizing the digital I/O ports 250 of the main controller 152. Specifically, three signal lines from the digital I/O ports are assigned to carry audio signals as discussed above, and are connected to the enhanced mouse connectors 132, 134.

The digital I/O ports are also used to control the electronic keyboard template 140. ICONS and symbols can be stored in the nonvolatile memory 158 and transferred to the electronic keyboard template via the assigned digital I/O port signal lines.

In accordance with the present invention, the main controller 152 also provides integrated analog input and output ports. In the present embodiment, two analog input channels are provided for audio input from the microphones 118, 120. In the present embodiment, the input channels for the audio input are provided with 40 dB gain. The analog input channel 0 AIP[0] is unbuffered in the present embodiment. The analog input ports are also used for inputs from the volume control 124, the contrast control 126, the brightness control 128 and the auxiliary control 129 as depicted in FIG. 2. In addition to providing an analog audio interface and an interface for the video and volume controls, the analog ports can be used for battery monitoring and control operations.

For audio operations, the main controller 152 provides for an IBM-AT compatible, pulse-code-modulated audio data interface via the asynchronous host computer interface 188 or via the enhanced mouse connectors 132, 134. As explained above, the enhanced mouse connectors 132, 134 have three signal lines assigned to carry digital audio data, as provided from a digital I/O port (Port B, lines PB[2:0] in the described embodiment.

The pulse code modulation is advantageously provided by appropriate sample time control for the ADC 320. Advantageously, the sample rate for the ADC 320 for audio data is 8 Khz. Using this sample rate, the audio data advantageously is compressed after it is digitized. In the present embodiment, with 8-bit resolution for the ADC 320, many compression algorithms well known in the art are available, such as ADPCM compression and decompression. If additional resolution is provided, conventional algorithms for U-LAW and A-LAW compression and decompression can be used. The compression is carried out in the central microcontroller 130 under software implementation. Alternatively, the sample rate can be reduced to 4 Khz, as in many digital phone systems. A sample rate of 4 Khz rather than 8 Khz, results in the same amount of data per second of audio as compressing the 8 Khz sample data by a ratio of two-to-one.

In summary, the audio data digitization sequence is as follows: (1) analog audio data is received via the microphones 118, 120; (2) the audio data is digitized using the ADC 320 of the analog input port (the sample timing is controlled in order to implement the pulse code modulation); (3) the pulse code modulated data is advantageously compressed; and (4) the compressed audio data is stored or transferred.

In transferring audio data to the host computer 102, conventional serial communication protocols can be used. The companion main controller of the host computer 102 and the main controller 152 of multimedia console keyboard 100 operate with the same serial communication protocol.

Similarly, if digital, compressed, pulse-code-modulated audio data is received from the host 102 via the enhanced mouse connector 132, 134, the data is first decompressed in the main controller 152. The decompressed, pulse code modulated audio data is provided from the central microcontroller to the DAC 322 of the analog output port via the ADC/DAC controller 350. The data is converted to analog audio data via the DAC 322. The conversion timing of the DAC 322 matches the sample timing for the digitization in order to demodulated the audio data. The audio data is presented to the speakers 114, 116 via the analog output port channels coupled to the speakers.

In summary, the audio data received through two analog input channels (AIP[1] and AIP[2] in the described embodiment) from the first and second microphones 118, 120 are digitized via the ADC 320 of the analog input port. If the digitized audio data is to be stored or transferred to the host 102, the digitized audio data preferably is compressed. Audio data is provided to the host 102 via the audio-out ADOUT signal line 209 of the mouse ports 132, 134 with clock signals provided on the audio-clock ADCLK signal line 210.

Similarly, audio data is received from the host 102 (or other external device over the audio-in ADIN signal line 207 of the mouse ports 132, 134. If digitized audio data is received from the host 102 (or other external device) for output to the speakers 114, 116, or generated by the main controller 152 for output to the speakers 114, 116, the data is decompressed, and the DAC 322 converts and demodulates the digital audio data to analog audio data for output to the first and second speakers 114, 116.

As mentioned above, in the present embodiment, four of the analog input channels are utilized for the volume control 124, the brightness control 126, the contrast control 128, and the auxiliary control 129. In the embodiment described above, the voltages of the potentiometers for the volume, brightness and contrast controls are digitized with the analog input port for the main controller 152. The brightness and contrast values are provided to the host computer, which can thereby control the display 104. The value of the volume control is utilized to control the output to the speakers 114, 116.

In the present embodiment, a digital input port is utilized for the computer power control switch for the computer as depicted in FIG. 2. Alternatively, the computer power control switch 122 could be connected to one of the expansion configuration latch inputs. When the power control switch 122 is activated, the main controller 152 activates the PC-ON signal line which is transmitted to the host computer 102 via the enhanced mouse connector 132, 134.

Accordingly, the present invention provides an integrated analog/digital preprocessor within a keyboard console to form a multimedia console keyboard wherein the audio is captured within the processor and passed to the host computer in digital form only if requested by the host computer 102. Similarly, the audio output data is generated within the main controller 152, of the multimedia console keyboard without the use of the host computer 102.

In the present embodiment, the fuzzy logic 312 provides digital signal processing, particularly adapted for pattern recognition. Advantageously, the fuzzy logic utilizes rudimentary digital signal processing such as recursively pipe lined Y=M*X+K numeric digital signal processing.

Although a particular embodiment of the present invention has been shown and described above, the description is intended to be illustrative of the invention and is not intended to be limiting. Various modifications and applications may occur without departing from the true spirit and scope of the invention as defined in the appended claims.

What is claimed is:

1. A multimedia computer keyboard remote to a host computer, said keyboard comprising:

a keyboard matrix having a plurality of keys;

at least one speaker associated with said keyboard;

at least one microphone associated with said keyboard; and a main controller in said keyboard, said main controller having an analog to digital converter coupled to said at least one microphone to receive at least one analog audio signal from said at least one microphone and convert said analog audio signal to digital audio data to transmit to said host computer, and said main controller having a digital to analog converter coupled to said at least one speaker, said digital to analog converter receiving digital audio data from said host computer and converting said digital audio data from said host computer to at least one analog signal to drive said at least one speaker, said main controller processing information received from said host computer and providing processed information to said host computer, thereby reducing the processing task of said host computer with respect to said speaker and said microphone, said main controller further coupled to said keyboard matrix, said main controller configured to detect the presence of an operator based on said digital audio data, and, in response to such presence, providing at least a predetermined audio output signal to said speaker.

2. The multimedia computer keyboard of claim 1, further comprising a pointing device integrated with said keyboard and coupled to said main controller.

3. The multimedia computer keyboard of claim 1, further comprising a power switch for an associated computer, said power switch integrated with said keyboard.

4. The multimedia computer keyboard of claim 1, said main controller further comprising an ADPCM digital audio data compression and decompression controller.

5. The multimedia computer keyboard of claim 1, said main controller further comprising a real time clock controller which generates an interrupt in response to a predetermined lapse of time, said interrupt causing said main controller to perform a predetermined function.

6. The multimedia computer keyboard of claim 1, further comprising video monitor controls associated with said keyboard and coupled to said main controller.

7. The multimedia computer keyboard of claim 6, wherein said video monitor controls comprise a contrast control and a brightness control for an associated computer monitor coupled to an associated computer.

* * * * *